Aug. 28, 1934.  A. MATTHEWS  1,971,865
REVERSING MECHANISM
Filed Aug. 31, 1932
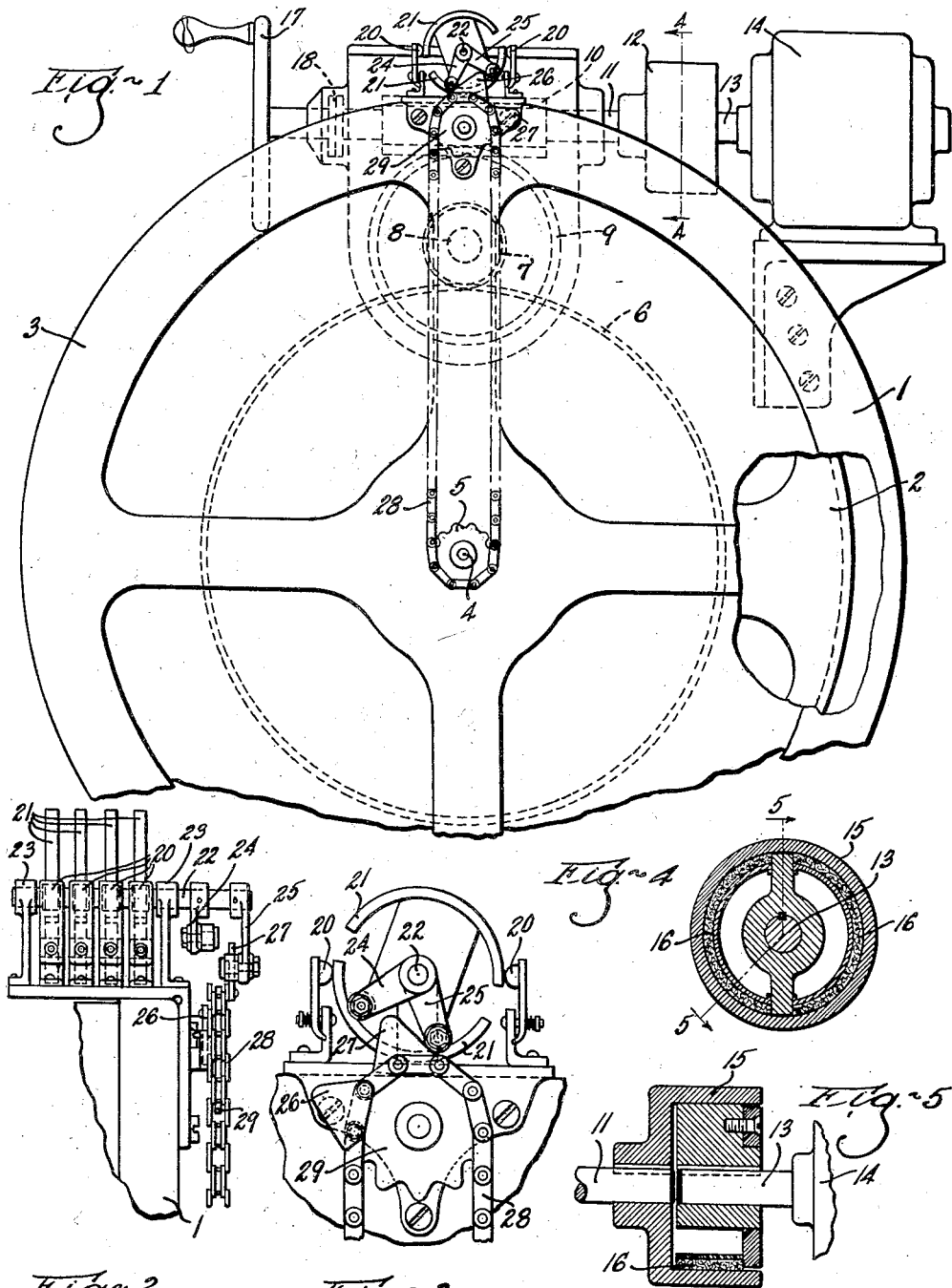
INVENTOR
ALBERT MATTHEWS
BY
Brockett, Hyde, Higley & Meyer
ATTORNEYS Patented Aug. 28, 1934

1,971,865

UNITED STATES PATENT OFFICE 1,971,865

REVERSING MECHANISM

Albert Matthews, Cincinnati, Ohio, assignor to The American Laundry Machinery Company, Cincinnati, Ohio, a corporation of Ohio Application August 31, 1932, Serial No. 631,247

1 Claim. (Cl. 172—240)

This invention relates to reversing mechanism, and particularly to mechanism for periodically reversing the rotation of a part to be driven, with a plurality of complete rotations of said part in one direction or the other during the several periods.

The object of the invention is to provide simple and efficient mechanism of this character, and in addition, a mechanism including an operating part coupled to the part to be driven and carrying an operating device or devices for accomplishing reversal, the arrangement being such as to produce reversal after a predetermined number of complete rotations of the part being driven.

A further object of the invention is to provide reversing mechanism of this character which is particularly suitable for the reversing of electric motors for driving a part to be driven, when such motors are of relatively small capacity and are reversed by throwing them directly across the line in the opposite direction, the invention providing simple, efficient and satisfactory mechanism for the purpose.

Further objects of the invention are in part obvious and in part will appear more in detail hereinafter.

In the drawing, which represents one suitable embodiment of the invention, Fig. 1 is an end elevation of the right hand end of a small capacity washing machine equipped with my improved reversing mechanism; Fig. 2 is a detail front elevation from the left in Fig. 1; Fig. 3 is an end elevation from the right in Fig. 2; Fig. 4 is a detail cross sectional view on approximately the line 4—4, Fig. 1; and Fig. 5 is a detail sectional view on approximately the line 5—5 Fig. 4.

The invention may be applied for use in the reversing of any kind of mechanism. It is particularly useful for the driving of a machine embodying a rotatable cylinder or drum which it is desired to rotate first in one direction and then in the opposite direction with a predetermined number of complete revolutions in each direction, say eight or ten. For convenience, and in no sense of limitation, the invention has been shown applied to a machine, which may be a washing machine, a drying tumbler or the like, and which includes a stationary outside casing or tub 1 within which rotates a drum or cylinder 2. The stationary tub or casing has two end frames, one of which, marked 3, is illustrated in Fig. 1. The drum 2 at its opposite ends is provided with shafts or trunnions extending through the end frames, the near trunnion 4 being illustrated in Fig. 1 as provided with a sprocket 5. The trunnion at the opposite end of the machine (not shown) is provided with means for driving the drum, such as a large gear 6 driven by a pinion 7 on a shaft 8 carrying a worm wheel 9 driven by a worm 10 on a shaft 11 connected by a clutch device 12 to the shaft 13 of a motor 14. The clutch 12 is preferably of friction type, including a friction drum 15 connected to one of the shafts, such as the shaft 11, and cooperating with friction shoes 16 connected to the other shaft, such as the motor shaft 13. As the motor, which is of reversing type, is rotated in one direction or the other, it obviously frictionally drives the drum 2 through the friction clutch and the speed reducing gearing described. 17 is a hand wheel normally free of connection to the mechanism but having its shaft provided on its inner end with a friction clutch 18 adapted to be clutched to the shaft 11 for manually moving the parts to rotate the drum 2 for registering its door with the casing door, as will be readily understood.

The circuit to the motor 14 includes switch devices actuated automatically by rotation of the drum in such manner as to periodically reverse the motor circuit. These switch devices are more or less conventionally shown but include a series of contactors 20 cooperating with a series of segments 21, the segments 21 being mounted in the usual manner upon a switch shaft 22 carried in suitable bearings 23 and provided at its end with two arms, marked respectively 24, 25, each of said arms carrying a roller. The arms are at an angle to each other and are offset longitudinally of the shaft 22, and said two arms 24, 25 are adapted respectively for operation by cams 26, 27 mounted on the links of an endless chain 28 travelling over the sprocket 5 before described and a sprocket 29 suitably mounted in a bracket attached to the end frame.

The electric circuits from the source of current supply through the switch mechanism and to the motor 14 are not illustrated, but will be understood to be any suitable circuits for the purpose with proper connection to the contactors and with proper bridging or connection between the various segments 21 necessary or suitable for the purpose.

With this construction the operation is as follows:—

Fig. 3 shows the parts immediately prior to operation of the switch shaft 22 for reversing the circuit. The motor 14 is assumed to be rotating in that direction to cause rotation of the chain 28 and sprocket 29 in the clockwise direction, Fig. 3. Cam 27 has just reached contact with the roller on arm 25. Further rotation of the parts causes said cam 27 to move to the right and turn the switch shaft 22 to the position shown in Fig. 1. The arm 24 and the roller upon it move down in front of the following cam 26, but before said cam 26 reaches its roller the motor circuit has been reversed, the drum 2 stops and the motor reverses and turns the drum in the opposite direction, so that the chain 28 and sprocket 29 in Fig. 3 rotate in the opposite direction. The chain carries with it the two cams 26, 27, which are compelled to travel down to and around the sprocket 5, coming up again on the right hand side, Fig. 1, until said cams reach the position shown in Fig. 1, which illustrates the parts just prior to the second operation of the switch mechanism. Here, the advance cam 26 engages the roller on arm 24 and turns said arm, the switch shaft 22 and the segments carried thereby to the position shown in Fig. 3, again causing stopping of the drum and rotation of the motor and the parts driven thereby in the opposite direction. The cycle of operations is thereupon repeated.

A more important advantage of the invention is in the use of the chain 28, or an equivalent part, of such length as compared to the circumference of the sprocket 5 as to compel a relatively large number of complete revolutions of the drum, say eight or ten, while the cams are moving around during the periods intervening between reversals. By a very simple mechanism, free from usual mechanical complications, the desired results are obtained in a simple and efficient manner.

Other advantages will readily occur to those skilled in the art.

What I claim is:

Apparatus of the class described, comprising a rotatable driven member, a driving motor therefor, an oscillatable switch shaft carrying electrical contacts for reversing said motor, two arms rigid with said shaft and spaced angularly thereabout, a first rotatable element journalled on an axis near the switch shaft, a second rotatable element remote therefrom and driven by the member-driving motor, a flexible driving member operatively connecting said rotatable elements, cams on said flexible driving member adapted to contact said arms when the driving member passes over the first rotatable element, there being a cam to coact with each of said arms, and said arms being so spaced about the shaft that the cams contact the arms alternately to oscillate the shaft in opposite directions and movement of one arm by its coacting cam away from contacting position moves the other arm into position to be contacted by its cam.

ALBERT MATTHEWS.